United States Patent
Charlas

(10) Patent No.: US 11,931,770 B2
(45) Date of Patent: Mar. 19, 2024

(54) METHOD FOR COATING AN AIRCRAFT TURBOMACHINE COMPONENT

(71) Applicant: SAFRAN AIRCRAFT ENGINES, Paris (FR)

(72) Inventor: Mathieu Julien Charlas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 7 days.

(21) Appl. No.: 17/439,194

(22) PCT Filed: Apr. 21, 2020

(86) PCT No.: PCT/EP2020/061080
§ 371 (c)(1),
(2) Date: Sep. 14, 2021

(87) PCT Pub. No.: WO2020/221624
PCT Pub. Date: Nov. 5, 2020

(65) Prior Publication Data
US 2022/0152648 A1  May 19, 2022

(30) Foreign Application Priority Data
May 2, 2019 (FR) ...................................... 1904630

(51) Int. Cl.
*B05D 1/12* (2006.01)
*F01D 5/28* (2006.01)

(52) U.S. Cl.
CPC ............... *B05D 1/12* (2013.01); *F01D 5/288* (2013.01); *F05D 2220/36* (2013.01); *F05D 2230/90* (2013.01)

(58) Field of Classification Search
CPC .................................. B05D 1/12; F01D 5/288
See application file for complete search history.

(56) References Cited

U.S. PATENT DOCUMENTS

| | | | |
|---|---|---|---|
| 2005/0196605 A1* | 9/2005 | Ramsey | C09D 175/16 428/323 |
| 2006/0281861 A1* | 12/2006 | Putnam | C09D 183/04 106/13 |
| 2009/0181180 A1* | 7/2009 | Poullos | B05D 7/586 427/475 |
| 2013/0029117 A1* | 1/2013 | Read | F01D 5/28 156/308.2 |
| 2018/0044771 A1 | 2/2018 | Strock | |

FOREIGN PATENT DOCUMENTS

| | | | |
|---|---|---|---|
| CN | 105003393 A | * 10/2015 | |
| EP | 1 352 934 A1 | 10/2003 | |
| EP | 2 060 328 A2 | 5/2009 | |
| EP | 2060328 A2 | * 5/2009 | ............. B05D 7/542 |
| EP | 2 907 975 A1 | 8/2015 | |
| EP | 3 219 925 A1 | 9/2017 | |
| FR | 2 979 660 A1 | 3/2013 | |
| KR | 20150025580 A | * 3/2015 | |

OTHER PUBLICATIONS

Polydimethylsiloxane (PDMS), 2013, in: Drioli E., Giorno L. (eds), Springer-Verlag Berlin Heidelberg, Encyclopedia of Membranes, p. 1-2 (Year: 2013).*
International Search Report as issued in International Patent Application No. PCT/EP2020/061080, dated Jul. 16, 2020.

* cited by examiner

*Primary Examiner* — Tabatha L Penny
(74) *Attorney, Agent, or Firm* — Pillsbury Winthrop Shaw Pittman LLP

(57) ABSTRACT

A process for coating an aircraft turbomachine component with an erosion-resistant coating, includes depositing the erosion-resistant coating by hot powder-coating on an aircraft turbomachine component made of an organic-matrix composite material or of a metallic material, the erosion-resistant coating including a polyurethane or silicone polymer, the polymer having a glass transition temperature of less than or equal to −30° C.

11 Claims, 1 Drawing Sheet

[Fig. 1]
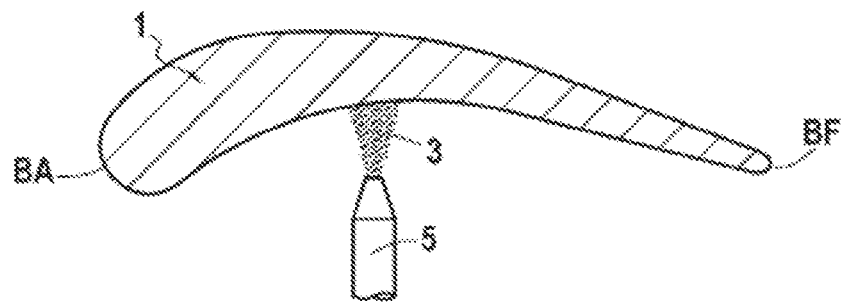
[Fig. 2]
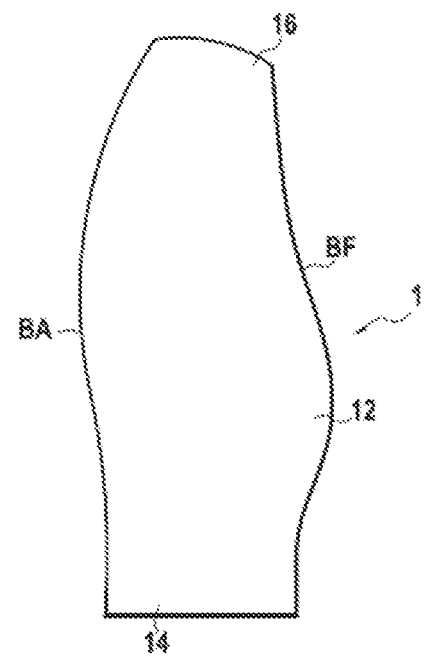
[Fig. 3]
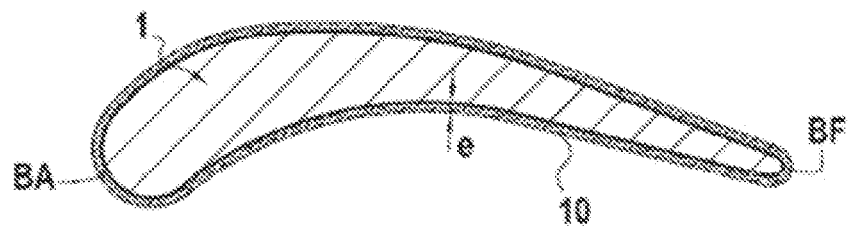

METHOD FOR COATING AN AIRCRAFT TURBOMACHINE COMPONENT

CROSS-REFERENCE TO RELATED APPLICATIONS

This application is the U.S. National Stage of PCT/EP2020/061080, filed Apr. 21, 2020, which in turn claims priority to French patent application number 1904630 filed May 2, 2019. The content of these applications are incorporated herein by reference in their entireties.

TECHNICAL FIELD

The present invention relates to a process for coating an aircraft turbomachine component with an erosion-resistant coating using a hot powder-coating technique.

PRIOR ART

Certain aircraft engine components, such as fan blades, can undergo high erosion during operation. This erosion is usually due to impacts with particles carried by the airflow sucked in by the engine. It is desirable to have a process for coating a turbomachine component with an erosion-resistant coating that is relatively simple to implement.

US 2018/044771 discloses a turbine blade comprising an abrasive tip produced by thermal spraying and laser ablation.

DISCLOSURE OF THE INVENTION

The present invention relates to a process for coating an aircraft turbomachine component with an erosion-resistant coating, the process comprising:
- depositing the erosion-resistant coating by hot powder-coating on an aircraft turbomachine component made of an organic-matrix composite material or of a metallic material, said erosion-resistant coating comprising a polyurethane or silicone polymer, said polymer having a glass transition temperature of less than or equal to −30° C.

The glass transition temperature, hereafter denoted "Tg", can be determined by differential scanning calorimetry (DSC).

Unless otherwise specified, the "erosion-resistant coating" will be referred to as "coating" hereinbelow. The expression "polyurethane or silicone polymer" will be referred to as "polymer". The expression "organic-matrix composite materiel" will be referred to as "OMC material".

The invention implements the hot powder-coating technique to form a polymeric erosion-resistant coating. This provides a particularly simple and automatable process. In particular, it is not necessary to carry out a bonding operation to fix an erosion-resistant film or to use an erosion-resistant paint. These techniques lengthen the production cycle and can be relatively complex to master. The choice of a polymer with a low Tg as described above guarantees the coating's elastic character even when the engine is used in a very low-temperature environment and thus reduces damage during particle impacts.

In an example embodiment, said polymer has a glass transition temperature of less than or equal to −55° C.

Such a feature advantageously further reduces damage to the coating upon particle impact.

In an example embodiment, the erosion-resistant coating further comprises ceramic and/or carbon particles.

The presence of such particles advantageously further improves the erosion resistance conferred by the coating.

In an example embodiment, the erosion-resistant coating her comprises a coloring agent.

The coloring agent advantageously constitutes a warning indicator when the damage to the erosion-resistant coating is too advanced and it is necessary to repair or replace the latter.

In an example embodiment, the erosion-resistant coating has a thickness comprised between 100 µm and 400 µm.

The thickness of the coating can be measured by ultrasound in the case of a component made of OMC material or by eddy current in the case of a component made of metallic material.

These thickness values optimize the compromise between protection against erosion and adhesion of the coating. The fact of limiting the thickness of the coating also limits the aerodynamic disturbance caused by this coating.

In an example embodiment, the component is made of an organic-matrix composite material and the component is maintained at a temperature of less than or equal to 120° C. during hot powder-coating.

The fact of limiting the temperature during hot coating advantageously limits any risk of altering the organic matrix of the component. Moreover, this feature is particularly advantageous in the particular case of a fan blade on which a leading edge has been added by bonding in order not to affect this bonding.

In an example embodiment, the turbomachine component is a fan component of an aircraft engine. For example, the component is a fan blade. The component may also be a fan rectifier blade or a sound insulation panel.

BRIEF DESCRIPTION OF THE DRAWINGS

FIG. 1 schematically illustrates the deposition of a coating by hot powder-coating on a fan blade according to an example embodiment of the invention.

FIG. 2 illustrates a fan blade that can be used in the context of the invention.

FIG. 3 shows the fan blade coated with the erosion-resistant coating after hot powder-coating.

DESCRIPTION OF THE EMBODIMENTS

The component 1 is in the illustrated example a fan blade. This is shown in cross-section relative to its height in FIG. 1. A full-height view of the fan blade is provided in FIG. 2. The fan blade 1 comprises a vane 12 that extends between a root portion 14 and a tip portion 16. The vane 1 has a leading edge BA and a trailing edge BF. As previously discussed, the invention is not limited to the coating of a fan blade. More generally, the component can be a component of the fan of the turbomachine. The component can be intended to be positioned in a secondary air stream bypassing the combustion chamber of the turbomachine. The turbomachine component can be a component of a cold part of a turbomachine, i.e., intended to be subjected during operation to a temperature of less than or equal to 300° C., for example less than or equal to 150° C.

The component can be made of OMC material. In this case, it comprises a fibrous reinforcement densified by an organic matrix, for example by an epoxy matrix. The fibrous reinforcement can for example be obtained by weaving, for example by three-dimensional weaving. Alternatively, the fibrous reinforcement can be formed by draping fibrous strata. The fibrous reinforcement may comprise carbon fibers, glass fibers or a mixture of such fibers. According to another example, the component can be made of metallic material, for example aluminum, titanium or an alloy thereof.

Before initiating deposition of the coating, the component 1 is first heated. A temperature of greater than or equal to 50° C., for example 80° C., can be imposed on the component 1.

Once the component 1 is heated, deposition by hot powder-coating is initiated. During this deposition, a powder 3 is sprayed on the component 1 maintained at temperature. The powder 3 is sprayed by a spray nozzle 5. The temperature imposed on the component 1 during hot powder-coating can be less than or equal to 120° C., and for example comprised between 50° C. and 120° C., for example between 80° C. and 120° C.

The sprayed powder 3 may comprise a mixture of the monomer of the polymer to be obtained and a crosslinking agent. On contact with the heated component 1, the monomer is crosslinked to obtain the erosion-resistant coating 10. By way of example, a mixture of a polyol and an isocyanate crosslinking agent can be used, which makes it possible to obtain a polyurethane polymer in the erosion-resistant coating 10. Alternatively, a coating comprising a silicone polymer can be formed using, for example, the product "630 series powder coating" marketed by the company FORREST Technical Coatings. The glass transition temperature of the resulting erosion-resistant coating 10 depends on the crosslinking density. It is part of the general knowledge of the person skilled in the art to choose the components of the mixture to be sprayed and their relative proportion so as to adjust the crosslinking density and obtain the desired Tg for the coating 10.

The polymer of the coating 10 can be thermosetting or thermoplastic. In the case of a thermosetting polymer, the coated component can be subjected to additional heat treatment after hot coating to further crosslinking. Alternatively, the polymer can be thermoplastic. In this case, the polymer forming the coating 10 can be sprayed directly onto the component 1 and not a mixture of a monomer and the crosslinking agent. For example, the thermoplastic polymer-"Polyurethane Protective Tape 8672" marketed by the company 3M™ can be used. This polymer has a glass transition temperature of –30° C. In general, care will be taken to have a sufficient melting temperature of the polymer to prevent the coating 10 from melting in operation when the polymer is thermoplastic, By way of illustration, the melting temperature of the thermoplastic polymer can be greater than or equal to 100° C., or even 150° C.

The powder can be sprayed, and thus the coating 10 formed, directly on the OMC or metallic material component. Alternatively, however, the hot powdered component may have an adhesion primer on which the coating is intended to be formed. The adhesion primer may comprise a silane. An example of a suitable adhesion primer is the product marketed as SP-121 by the company NuSil. When the component 1 is mounted in the turbomachine, it can be coated only with the coating 10 with optionally the adhesion primer. In particular, the component 1 may not be coated with an erosion-resistant paint.

According to an example, the sprayed powder 3 may further comprise ceramic and/or carbon particles, such as alumina, silica or silicon carbide particles. In this case, the coating 10 obtained will be filled with ceramic and/or carbon particles. By way of illustration, the mass content of ceramic and/or carbon particles in the coating 10 can be comprised between 0.1% and 30%.

The coating 10 can be deposited in one or more layers. The thickness e of the coating 10 can be between 100 µm and 400 µm. According to an example, the thickness of the coating can change along the surface of the component 1 in order to locally reinforce the protection. Alternatively, the thickness e of the coating 10 is uniform over the entire surface of the component 1 as shown in FIG. 3.

The expression "comprised between . . . and . . . " should be understood as including the bounds.

The invention claimed is:

1. A process for coating an aircraft turbomachine component with an erosion-resistant coating, the process comprising:
heating the aircraft turbomachine component to a temperature, then
once the aircraft turbomachine component has been heated to said temperature, initiating deposition of the erosion-resistant coating and depositing the erosion-resistant coating while the heating of said aircraft turbomachine component is maintained, the erosion-resistant coating being deposited by hot powder-coating of a powder including a mixture of a monomer of the polymer that forms said erosion-resistant coating and a cross-linking agent on said heated aircraft turbomachine component made of an organic-matrix composite material or of a metallic material, said polymer being a polyurethane or silicone polymer, said polymer having a glass transition temperature of less than or equal to –30° C., and wherein the monomer is crosslinked on contact with the heated aircraft turbomachine component.

2. The process as claimed in claim 1, wherein said polymer has a glass transition temperature of less than or equal to –55° C.

3. The process as claimed in claim 1, wherein the erosion-resistant coating further comprises ceramic and/or carbon particles.

4. The process as claimed in claim 1, wherein the erosion-resistant coating further comprises a coloring agent.

5. The process as claimed in claim 1, wherein the erosion-resistant coating has a thickness comprised between 100 µm and 400 µm.

6. The process as claimed in claim 1, wherein the aircraft turbomachine component is made of an organic-matrix composite material and wherein the aircraft turbomachine component is maintained at a temperature of less than or equal to 120° C. during hot powder-coating.

7. The process as claimed in claim 1, wherein the aircraft turbomachine component is a fan component of an aircraft engine.

8. The process as claimed in claim 7, wherein the aircraft turbomachine component is a fan blade.

9. The process as claimed in claim 1, wherein said erosion-resistant coating comprises a polyurethane polymer.

10. The process as claimed in claim 1, further comprising, before initiating said depositing, heating the aircraft turbomachine component to a temperature greater than or equal to 50° C.

11. The process as claimed in claim 1, wherein the erosion-resistant coating consists of a single layer.

* * * * *